(12) United States Patent
Tempest

(10) Patent No.: US 6,443,462 B2
(45) Date of Patent: Sep. 3, 2002

(54) HIGH SPEED DRILL HOLDERS

(75) Inventor: Michael C Tempest, Poole (GB)

(73) Assignee: Westwind Air Bearings Ltd., Dorset (GB)

( * ) Notice: Subject to any disclaimer, the term of this patent is extended or adjusted under 35 U.S.C. 154(b) by 0 days.

(21) Appl. No.: 09/911,717

(22) Filed: Jul. 25, 2001

Related U.S. Application Data

(63) Continuation of application No. PCT/GB00/00038, filed on Jan. 10, 2000.

(30) Foreign Application Priority Data

Jan. 26, 1999 (GB) ............................................. 9901718

(51) Int. Cl.$^7$ ............................ B23B 31/14; B23P 13/02
(52) U.S. Cl. ..................... 279/131; 279/33; 279/43.1; 279/2.2; 192/105 CF; 29/558
(58) Field of Search ................................. 279/129, 131, 279/33, 35, 43.1, 46.1, 46.2, 2.2; 192/105 BA, 105 BB, 105 C, 105 CP, 105 CS, 105 CD, 105 CE, 105 CF; 29/558

(56) References Cited

U.S. PATENT DOCUMENTS

| 2,481,094 | A | | 9/1949 | Edwards | |
|---|---|---|---|---|---|
| 2,729,038 | A | * | 1/1956 | Hutchins | ..................... 279/33 |
| 3,975,029 | A | | 8/1976 | Benjamin | |
| 4,572,525 | A | * | 2/1986 | Feldmeier et al. | .......... 279/131 |
| 4,802,680 | A | * | 2/1989 | Fuchs | .......................... 279/33 |
| 4,821,859 | A | * | 4/1989 | Suchdev et al. | ...... 192/105 CD |

FOREIGN PATENT DOCUMENTS

| FR | 976 808 | 3/1951 |
|---|---|---|
| WO | WO95/09711 | 4/1995 |

* cited by examiner

Primary Examiner—Steven C. Bishop
(74) Attorney, Agent, or Firm—Nixon & Vanderhye

(57) ABSTRACT

A collet for carrying a high-speed drill which comprises a collar (2) arranged to enclose a drill shank (1), an outer rim support (8) arranged for attachment to a drill, and a clamping mechanism between the collar and the outer rim support (8). The clamping mechanism is arranged to provide clamping forces between said outer rim support (8) and said collar so that said collar tightly grips a drill shank (1), as a consequence of centrifugal forces and of off center sprag effect forces.

10 Claims, 2 Drawing Sheets

HIGH SPEED DRILL HOLDERS

This application is a continuation of International Application PCT/GB00/0038, filed Jan. 10, 2000, based on application Ser. No. 9901718.8, filed in Great Britain on Jan. 26,1999, the contents of which are incorporated herein by reference.

The present invention relates to holders, particularly collets or chucks, for holding high speed drills. When very fine drills are used, the rotational speeds have to become very high and indeed some systems use drills rotating at speeds in the region of 180,000 rpm. Such high speeds are necessary because as the diameter of the drill becomes less, its rotational speed has to increase so as to ensure a suitably high peripheral cutting speed. However with such very high rotational speeds, centrifugal forces become very large and they then act in opposition to forces holding the drill shank in position. This then creates inaccuracies in drilling performance.

The object of the present invention therefore is to provide a simple drill holder for high speed drilling and light routing which maintains a very high standard of accuracy, retains the drill bit tightly gripped, and is immune to the adverse affects of excessive speed, such as loosening of the drill due to centrifugal forces.

Accordingly the present invention provides a drill holder, for example a collet or chuck, for carrying a high speed drill, said drill holder comprising a collar arranged to enclose a drill shank, an outer rim support arranged for attachment to a drill, and a clamping mechanism between the collar and the outer rim support, said clamping mechanism being arranged to provide clamping forces between said outer rim support and said collar so that said collar tightly grips a drill shank, as a consequence of centrifugal forces and of off-centre sprag effect forces.

It should be explained that a sprag effect force is a force due to an offset pressure in a direction opposed to that of rotation. Sprag effect forces were originally used on railway waggons in the nineteenth century where a sprag, or piece of timber, was placed against a wagon wheel on a railway line at an orientation directed slightly above the centre line of the wheel to act as a brake. In such a case as the wheel tries to move towards the sprag the pressure increases due to the offset force of the sprag with respect to the axle of the wheel. Clutches have been devised based on the sprag effect where a wedging effect increases against the direction of rotation to provide for a clutching action.

Several embodiments of the invention will now be described by way of example with reference to the accompanying diagrammatic drawings in which.

Figure 1:
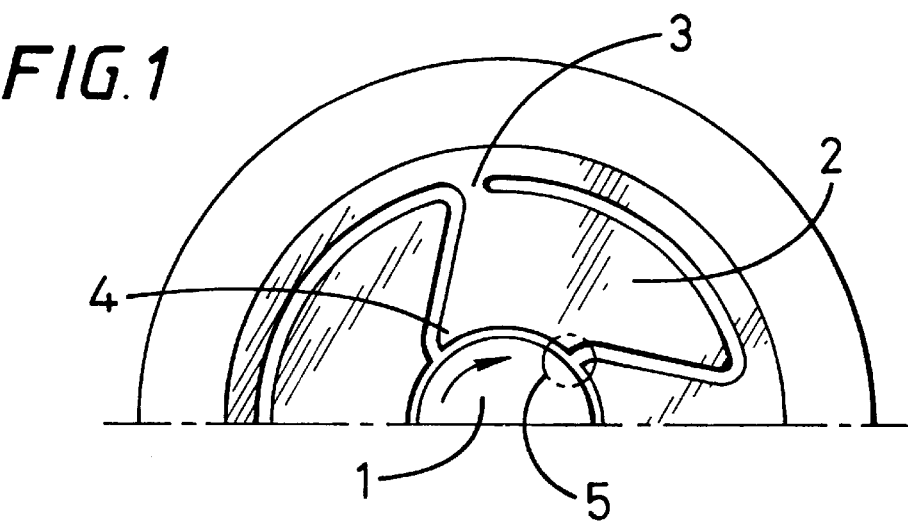
FIGS. 1 and 2 show section and perspective views of a first embodiment.

Referring to FIG. 1 the invention provides a form of collet which utilises centrifugal force coupled with use of a sprag force for keeping a collet in gripping contact with a drill shank 1.

The drill shank 1 is held in a series of jaws 2 spaced symmetrically about the shank. When the collet is rotated, the jaw 2 pivots about an integral hinge 3 causing the leading edge of the jaw, at the position 4, to exert pressure on the shank 1. It will be seen that the hinge 3 is of the solid type where a small amount of material holds the two parts integrally together and flexes in use.

Figure 2:
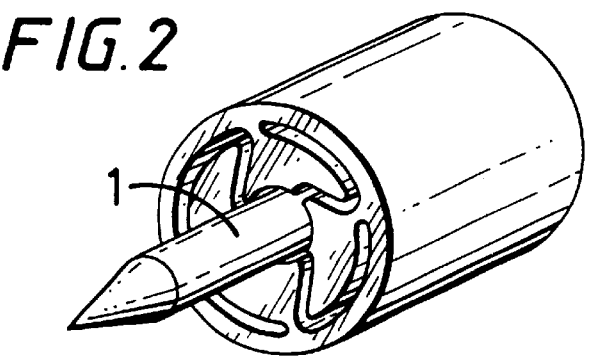

It will be appreciated that the line passing through the hinge and the leading edge of the jaw does not pass through the axis of rotation. This brings in the sprag effect in such a way that when the torque is imposed on the shank in the direction of the arrow, the jaws grip more tightly. The magnitude of the effect is governed by the geometry and the size and form of the jaws. The form of the collet is shown in FIG. 2 in perspective where it may be seen that the complete device takes the form of a small cylinder of a suitable length to encompass the drill shank 1.

The structure is formed by an EDM (electro-discharge machining or spark erosion) process so that the cylinder is of a suitable shape where it can be shrink fitted into a shaft at a suitable stage during the manufacturing process. An important feature is that the bore into which the shank is fitted is finished by bore grinding in the spindle. If the shaft is supported by an air bearing, then the finished bore should run true to 0.00003 inches TIR (total indicator run out, or swing between maximum and minimum dimension). In order to facilitate bore grinding, the jaws would remain linked together in the region 5 of FIG. 1 until final assembly.

On completion, the EDM process is used to separate the jaws, by mounting the shaft vertically, and passing a cutting wire through the hollow shaft.

The centrifugal forces acting on the jaws of such a device at high speed can be very large, and hence it is necessary to provide means by which they can be limited to a reasonable level.

Figure 3:
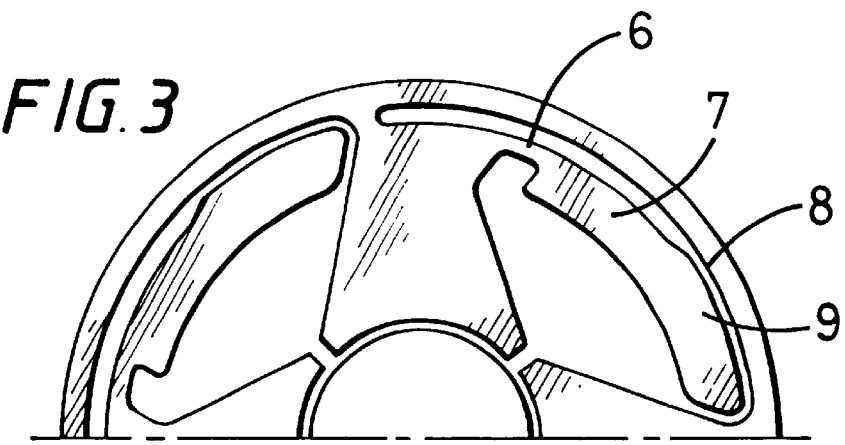
FIG. 3 shows a section view of a second embodiment.

An alternative form of the jaw to take account of this problem is shown in FIG. 3. Here it may be seen that not only has the jaw been reduced in size, but also has an additional solid hinge which is provided at 6. The bob weight 7 now imposes torque to close the jaw, but the absolute magnitude of the force is limited by the flexibility of the hinge 6. When rotation has generated sufficient grip of the shank, the flexure of the hinge 6, causes the bob weight 7 to engage the outer rim 8 at the land 9. It will be appreciated that there are a wide variety of configurations all within the compass of this concept. As indicated earlier, the sprag effect enhances the grip and therefore enables the collet to deal with heavy duty situations.

Figure 4:
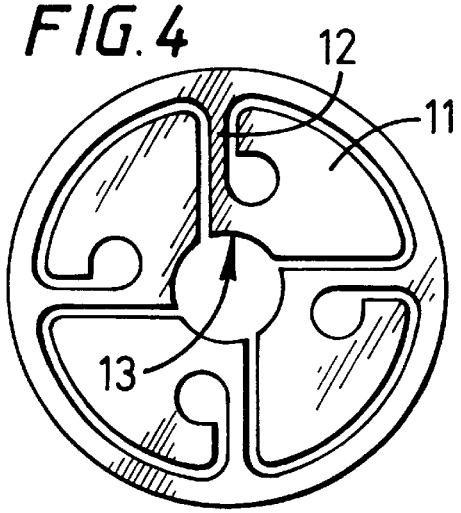
FIGS. 4, 5, 6, 7 and 8 show section views of further arrangements in accordance with the invention.

Further variations are then shown in FIGS. 4 to 8. FIG. 4 shows a similar arrangement to the original FIG. 1 arrangement where during rotation a bob weight 11 causes bending of a cantilever hinge 12, resulting in contact of a jaw 13 with the tool shank (not shown but located centrally). The geometry of the cantilever 12 is such that when a torque is imposed on the tool shank, the cantilever is induced to bend further, thus increasing the radial pressure on the tool shank. This is operating in the same way as with the well known sprag clutch.

Figure 5:
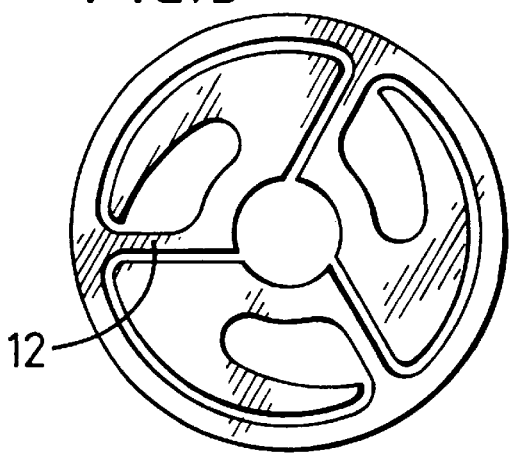

The number of jaws is dependent on the particular application, and indeed on design choice as is the particular shaping of the bob weight 11. Thus, FIG. 5 shows a similar arrangement to FIG. 4 but using less jaws, i.e. three, and a slightly different configuration of bob weight which therefore provides slightly different forces.

Figure 6:
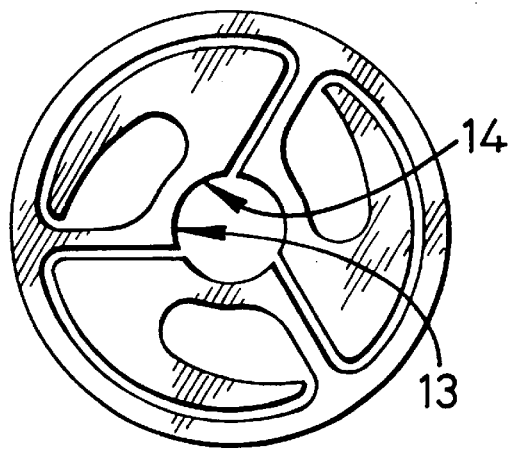

In FIG. 6 the jaw has been reduced in thickness. This is in an attempt to encourage rotation about the initial contact point 13 with a view to finally obtaining additional contact at 14 by virtue of flexure of the collet jaw.

Figure 7:
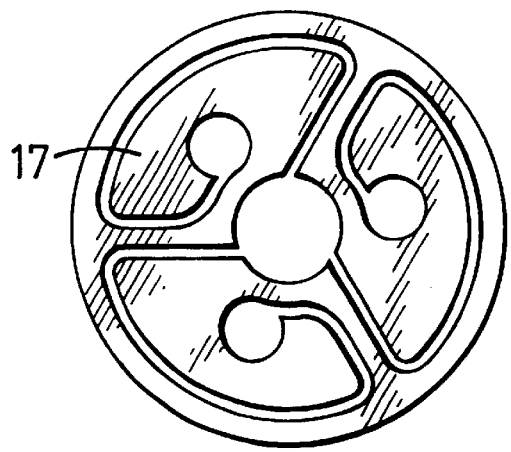

In FIG. 7 the mass of the bob weight at 17 has been increased to improve torque transmission.

Figure 8:
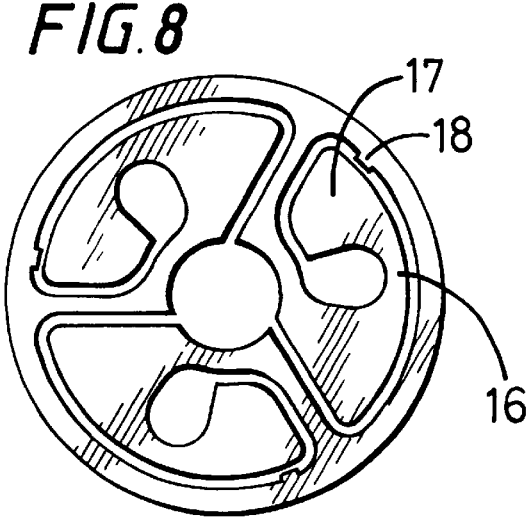

And then in FIG. 8 a second hinge 16 has been incorporated to allow greater movement of the bob weight 17, this results in the weight 17 finally coming into contact with a positive stop 18. For high speed operation it is imperative that provision is made to avoid excessive movement of the bob weights which would result in unacceptable stress levels.

Figure 9:
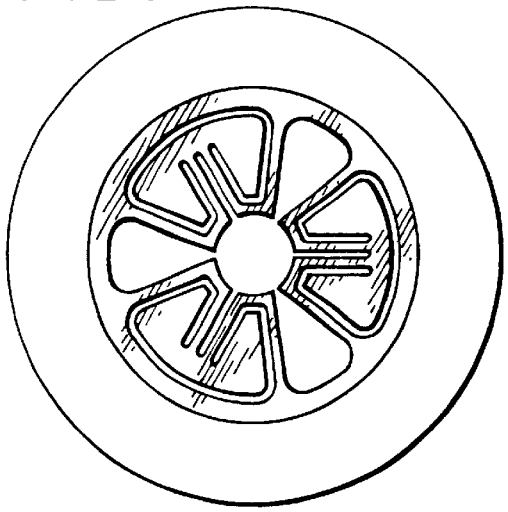
FIG. 9 shows a multi-jaw arrangement.

Finally FIG. 9 shows a six jaw system comprising three pairs of siamesed jaws. In this case alternate jaws in the direction of rotation provide a sprag force locking system while the other jaws of each pair provide pressure generated by centrifugal force but without augmentation by sprag forces. In this case rotation in the reverse direction would bring in sprag forces from the other jaws.

In all the described cases, it is important that the spragging arrangement is not at too direct an angle otherwise pull through can arise, resulting in the collet being permanently locked. That is the radial element stands risk of snapping through the central position to a position where it is directed into the shank from the opposite direction. This can be unloaded in most cases by high speed rotation in the reverse sense, but would be impossible in the siamesed example of FIG. 9, because in that case the alternative jaws would then lock on due to spragging in the reverse direction. Thus, the angle of offset should always be greater than a few degrees to avoid this problem. Also in the FIG. 9 example the geometry of the arrangement should only introduce a relatively low spragging force since otherwise it might be impossible to remove the drill shank subsequently.

In all of these described examples adequate provision is necessary to ensure that the drill shank is correctly located within the bore of the collet. When a tool shank is loaded automatically into the collet it is important that it is inserted to a specific depth, governed by a stop to the rear of the collet bore. In the static condition, that is when the collet is open, it will be appreciated that there is no gripping force to secure the tool shank centrally in the defined axial position. The presence of an O-ring located in an annular groove in the collet bore overcomes this problem, although it has to be said that this particular measure has been used previously in other forms of collet. Generally the O-ring section would have a nominal bore of 0.125 inches with a sectional diameter of 1 mm.

It should also be noted that in use the collet may grip the tool shank particularly tightly as a consequence of the sprag effect, and be reluctant to release the tool in the static condition afterwards. A tool loading/unloading mechanism therefore may be required capable of giving the tool a small sharp angular motion in the direction of drilling to effect release of the shank.

What is claimed is:

1. A drill holder for carrying a high-speed drill, said drill holder comprising a collar arranged to enclose a drill shank, an outer rim support arranged for attachment to a drill, and a clamping mechanism between the collar and the outer rim support, said clamping mechanism being arranged to provide clamping forces between said outer rim support and said collar so that said collar tightly grips a drill shank, as a consequence of centrifugal forces and off-center sprag effect forces, said collar, outer rim support and clamping mechanism being integrally formed from a single piece of material, said clamping mechanism including siamesed pairs of connecting arms of rotationally opposed but similar shape so that the sprag forces will act in either direction of rotation.

2. A drill holder for carrying a high-speed drill, said drill holder comprising a collar arranged to enclose a drill shank, an outer rim support arranged for attachment to a drill, and a clamping mechanism between the collar and the outer rim support, said clamping mechanism being arranged to provide clamping forces between said outer rim support and said collar so that said collar tightly grips a drill shank, as a consequence of centrifugal forces and off-center sprag effect forces, said collar, outer rim support and clamping mechanism being integrally formed from a single piece of material, said clamping mechanism including a plurality of connection arms arranged around a principal rotary axis of the drill holder and each arm being offset with respect to a direction radial to said axis of rotation.

3. A drill holder according to claim 1 including, attached to each connection arm via a solid weakness hinge, a bob weight which is arranged to flex outwards under centrifugal force to contact the outer rim and thereby limit the effective sprag force.

4. A drill holder according to claim 2 including, attached to each connection arm, a bob weight which is arranged to flex outwards under centrifugal force to bend the connecting arm and thereby to further increase the sprag force.

5. A drill holder according to claim 2 including a solid weakness hinge and a positive stop so that the bob weight movement is limited to avoid excessive sprag forces.

6. A drill holder for carrying a high-speed drill, said drill holder comprising a collar arranged to enclose a drill shank, an outer rim support arranged for attachment to a drill, and a clamping mechanism between the collar and the outer rim support, said clamping mechanism being arranged to provide clamping forces between said outer rim support and said collar so that said collar tightly grips a drill shank, as a consequence of centrifugal forces and off-center sprag effect forces, said collar, outer rim support and clamping mechanism being integrally formed from a single piece of material, said clamping mechanism including a plurality of connection arms arranged around a principal rotary axis of the drill holder, each connection arm in said plurality thereof being joined to the outer rim support via a respective integral hinge and each connection arm having at a distal end a jaw with a leading edge, each of the jaws forming part of said collar, and the plurality of connection arms being arranged so that for each arm, a line passing through the respective integral hinge and the respective leading edge does not pass through said principal rotary axis.

7. A drill holder according to claim 6 including, attached to each connection arm via a solid weakness hinge, a bob weight which is arranged to flex outwards under centrifugal force to contact the outer rim and thereby limit the effective sprag force.

8. A drill holder according to claim 6 including, attached to each connection arm, a bob weight which is arranged to flex outwards under centrifugal force to bend the connecting arm and thereby to further increase the sprag force.

9. A drill holder according to claim 6 including a solid weakness hinge and a positive stop so that the bob weight movement is limited to avoid excessive sprag forces.

10. A method of manufacturing a drill holder for carrying a high-speed drill, said drill holder comprising a collar having an integral surface arranged to enclose a drill shank, an outer rim support arranged for attachment to a drill, and a clamping mechanism between the collar and the outer rim support, said clamping mechanism being arranged to provide clamping forces between said outer rim support and said collar so that said collar tightly grips a drill shank, as a consequence of centrifugal forces and off-center sprag effect forces, the collar, outer rim support and clamping mechanism being integrally formed from a single piece of material, the method comprising the steps of:

finishing the internal surface of said collar by bore grinding whilst the collar is continuous; and after said finishing step, separating the collar into a plurality of jaws which are movable relative to one another.

* * * * *